United States Patent [19]

Nakagawa et al.

[11] 4,245,066

[45] Jan. 13, 1981

[54] WHOLLY AROMATIC POLYAMIDE BLEND COMPOSITION

[75] Inventors: Yasuo Nakagawa; Keizo Shimada; Tsutomu Nakamura, all of Iwakuni, Japan

[73] Assignee: Teijin Limited, Osaka, Japan

[21] Appl. No.: 58,918

[22] Filed: Jul. 19, 1979

[30] Foreign Application Priority Data

Jul. 31, 1978 [JP] Japan ................................. 53-92647
Aug. 22, 1978 [JP] Japan ................................ 53-101426

[51] Int. Cl.$^3$ ............................................. C08L 77/10
[52] U.S. Cl. .................................... 525/432; 260/30.2; 260/30.8 R; 260/32.6 NA; 260/45.9 NC; 525/6; 528/184; 528/191; 528/337; 528/347; 528/348; 528/349
[58] Field of Search .................... 525/432, 6; 528/348, 528/184, 191; 260/45.9 NC

[56] References Cited

U.S. PATENT DOCUMENTS 3,817,941  6/1974  Bair et al. ............................ 528/348

Primary Examiner—Harold D. Anderson
Attorney, Agent, or Firm—Burgess, Ryan and Wayne

[57] ABSTRACT

A wholly aromatic polyamide composition which is suitable for producing filaments or fibers having not only an excellent heat-resisting property but also, a superior dyeing property, which comprises:

(A) 50 to 95% by weight of poly-m-phenylene isophthalamide, and;

(B) 5 to 50% by weight of at least one other aromatic polyamide comprising:

(1) an amine moiety consisting of essentially of (a) 35 to 100 molar % of at least one phenylene diamine in which the phenylene group has 1 to 4 substituents respectively selected, independently from each other, from the group consisting of halogen atoms and alkyl radicals having 1 to 4 carbon atoms, and (b) 0 to 65 molar % of at least one other aromatic diamine, and;

(2) an acid moiety consisting essentially of at least one aromatic dicarboxylic acid.

11 Claims, No Drawings

WHOLLY AROMATIC POLYAMIDE BLEND COMPOSITION

The present invention relates to a wholly aromatic polyamide composition. More particularly, the present invention relates to a wholly aromatic polyamide composition suitable for producing filaments or fibers having excellent dyeing properties and superior heat-resisting properties.

It is known that the so-called wholly aromatic polyamide resins have higher softening and melting points than those of aliphatic polyamide resins, and exhibit desirable physical and chemical properties, such as: excellent heat-resisting properties, for example, a high ratio of mechanical strength at an elevated temperature to that at a room temperature, superior stabilities in dimension and shape to an elevated temperature, and a high resistance to thermal decomposition; high resistances to various chemicals; superior electrical properties, for example, a high dielectric breakdown strength, and; superior mechanical properties, for example, a high tensile strength and high Young's modules. Also, it is known that the wholly aromatic polyamide resins have high orienting and crystallizing properties. Accordingly, the wholly aromatic polyamide resins are suitable as a material for producing filaments, fibers and films having a high heat resistance, a superior flame-retarding property, and high tensile strength and Young's modulus.

However, the conventional filaments or fibers consisting of the wholly aromatic polyamide exhibit a disadvantage in that it is difficult to dye the filaments or fibers by conventional dyeing procedures, due to the high degrees of orientation and crystallinity thereof. Accordingly, the conventional wholly aromatic polyamide filaments or fibers are utilized, in the non-dyed form, as electric insulating material for motors and transformers, or as industrial materials for producing filter bags or heating tubes, which materials are not required to be colored. However, the conventional wholly aromatic polyamide filaments or fibers are not used as materials which are required to be beautifully colored, for example, materials for clothing. Accordingly, it is desirable to provide a new type of aromatic polyamide material which is suitable for producing the filaments or fibers which can be easily dyed with conventional dyes.

Japanese Patent application Publication No. 45-34776(1970) each disclosed a method for producing filaments or fibers from a modified aromatic polyamide copolymer which contains repeating units having a functional radical which exhibits a high degree of affinity to dyes, for example, a sulfonic acid radical, a tertiary amino radical and a quaternary ammonium radical. Also, each of Japanese Patent application Publication Nos. 49-32658(1974), 49-32659(1974), 49-33594(1974) and 50-8106(1975) disclosed a method for producing filaments or fibers from a composition containing the above-mentioned modified aromatic polyamide copolymer and a non-modified wholly aromatic polyamide. However, it was found that the above-mentioned fibers or filaments exhibited a significantly poor heat resisting property, which is very important when they are used practically, while the filaments or fibers exhibited an enhanced dyeing property.

Accordingly, it is clear that the above-mentioned conventional aromatic polyamide compositions are not suitable as materials for producing the shaped articles which are required to be highly resistant to a high temperature of 300° C. or more. This is because the sulfone radical or its alkali metal, or alkaline earth metal salt radical, in the compositions has a poor thermal stability.

An object of the present invention is to provide an aromatic polyamide composition which is suitable for producing filaments or fibers having not only an excellent dyeing properties but, also, superior heat resisting properties.

The above-mentioned object can be attained by the aromatic polyamide composition of the present invention which comprises:
(A) 50 to 95% by weight of poly-m-phenylene isophthalamide, and;
(B) 5 to 50% by weight of at least one other aromatic polyamide comprising:
   (1) an amine moiety consisting essentially of (a) 35 to 100 molar % of at least one phenylene diamine, in which the phenylene group has 1 to 4 substituents respectively selected, independently from each other, from the group consisting of halogen atoms and alkyl radicals having 1 to 4 carbon atoms, and (b) 0 to 65 molar % of at least one other aromatic diamine, and;
   (2) an acid moiety consisting essentially of at least one aromatic dicarboxylic acid.

The aromatic polyamide composition of the present invention comprises 50 to 95% by weight of poly-m-phenylene isophthalamide (A) and 5 to 50% by weight of at least one other aromatic polyamide (B). When the content of the other aromatic polyamide (B) is less than 5% by weight, the filaments made of the resultant composition will exhibit a poor dyeing property even if the heat resistance, for example, thermal shrinkage at a temperature of 300° C., of the filaments is satisfactory. If the content of the other aromatic polyamide (B) in the composition is more than 50% by weight, the resultant filaments will exhibit a very poor heat resistance, for example, a thermal shrinkage of more than 30% at 300° C., while the dyeing property of the filaments is satisfactory.

It is preferable that the content of the other aromatic polyamide (B) in the composition of the present invention be adjusted in a range of from 5 to 30% by weight, more preferably, from 10 to 25% by weight in consideration of the chemical composition of the other aromatic polyamide per se.

The other aromatic polyamide (B) in the composition of the present invention comprises an amine moiety (1) consisting essentially of 35 to 100 molar % of at least one halogen- or alkyl-substituted phenylene diamine (a) and 0 to 65 molar % of at least one other aromatic diamine (b), and an acid moiety (2) consisting essentially of at least one aromatic dicarboxylic acid, and polycondensed with the amine moiety (1).

If the content of the halogen- or alkyl-substituted phenylene diamine (a) in the amine moiety (1) is less than 35 molar %, the resultant filaments or fibers will exhibit a remarkably poor dyeing property. Preferably, the content of the halogen- or alkyl-substituted phenylene diamine (a) in the amine moiety (1) is in a range of from 35 to 100 molar %, more preferably, from 70 to 100 molar %.

The amino radicals in the halogen- or alkyl-substituted phenylene diamine are preferably oriented either meta or para. That is, the halogen- or alkyl-substituted phenylene diamine is preferably selected from the group consisting of halogen- or alkyl-substituted m-phenylene diamines and halogen- or alkyl-substituted p-phenylene diamines.

The phenylene group in the halogen- or alkyl-substituted phenylene diamine (a) has 1 to 4 substituents selected from the group consisting of halogen atoms, for example, fluorine, chlorine, bromine and iodine atoms, preferably, chlorine and bromine atoms, and alkyl radicals having 1 to 4 carbon atoms, for example, methyl, ethyl, n-propyl, isopropyl, n-butyl, isobutyl and secondary butyl radicals, preferably, methyl and ethyl radicals. The number of the substituents in the benzene ring is preferably one or two, more preferably, one. When the number of the substituents is two or more, the substituents may be either the same as or different from each other. When the substituent is an alkyl radical, it is preferable that the number of carbon atoms in the alkyl radical be less than 4, preferably, one or two. This is because as the number of the substituents and/or the number of the carbon atoms in the alkyl radical increases the polymerization property of the substituted phenylene diamine, the solubility in a solvent and the heat-resisting property of the resultant other aromatic polyamide (B) become poorer.

The halogen- substituted phenylene diamine usable for the present invention include, for example, 2,4-diamino-chlorobenzene, 2,6-diamino chlorobenzene, 3,5-diaminochlorobenzene, 2,6-diamino-1,4-dichlorobenzene, chloro-p-phenylene diamine, 2,5-diamino-1,4-dichlorobenzene. The most preferable halogen-substituted phenylene diamine is 2,4-diaminochlorobenzene.

The alkyl-substituted phenylene diamine usable for the present invention include, for example, 2,5-diaminotoluene, 2,4-diaminotoluene, 2,6-diaminotoluene, 4-ethyl-m-phenylene diamine, 2-ethyl-m-phenylene-diamine, 4-isopropyl-m-phenylene diamine, 4-b-butyl-m-phenylene diamine, 2-ethyl-p-phenylene diamine, 2,6-dimethyl-m-phenylene diamine, 4,6-dimethyl-m-phenylene diamine, 2,5-dimethyl-p-phenylene diamine and 2,3,5,6-tetramethyl-p-phenylene diamine.

The preferable alkyl-substituted phenylene diamines are 2,5-diaminotoluene, 2,4-diaminotoluene, 2,6-diaminotoluene, 4-ethyl-m-phenylene diamine, 2-ethyl-m-phenylene diamine, 4-isopropyl-m-phenylene diamine, 2,5-dimethyl-p-phenylene diamine, and 4,6-dimethyl-m-phenylene diamine.

The more preferable alkyl-substituted phenylene diamines are 2,4-diaminotoluene and 2,6-diaminotoluene.

The other aromatic diamine (b) is preferably selected from the group consisting of unsubstituted phenylene diamines, naphthylene diamines, biphenylene diamines, diphenylether diamines, diphenylthioether diamines, diphenylmethane diamines and diphenylsulfone diamines.

The unsubstituted other aromatic diamines (b) include, for example, p-phenylene diamine, m-phenylene diamine, 2,6-naphthylene diamine, 4,4'-biphenylene diamine, 4,4'-diaminodiphenyl ether, 3,4'-diaminodiphenyl ether, 4,4'-diaminodiphenyl methane, 4,4'-diaminodiphenyl sulfone and 3,3'-diaminodiphenyl sulfone. Preferably, the other aromatic diamine (b) is selected from the group consisting of p-phenylene diamine, m-phenylene diamine, 3,3'-diaminodiphenyl sulfone, and 4,4'-diaminodiphenyl ether. The more preferable aromatic diamine (b) is m-phenylene diamine.

The aromatic dicarboxylic acid as the acid moiety (2) the other aromatic polyamide (B) includes phenylene dicarboxylic acids and naphthalene dicarboxylic acids. The aromatic dicarboxylic acid may be either unsubstituted or substituted with at least one substituent which is bonded to the aromatic ring of the aromatic dicarboxylic acid and which is not reactive to acid halide radicals and amino radicals. The substituent in the aromatic dicarboxylic acid may be selected from the group consisting of halogen atoms, alkyl radicals having 1 or 2 carbon atoms, a phenyl radical, carboalkoxy radicals in which the alkoxy group has 1 to 2 carbon atom, alkoxy radical having 1 or 2 carbon atoms, a nitro radical and thioalkyl radicals having 1 or 2 carbon atoms.

The aromatic dicarboxylic acid usable as the acid moiety (2) in the other aromatic polyamide (B) includes terephthalic acid, monochloroterephthalic acid, dichloroterephthalic acid, tetrachloroterephthalic acid, dichloroterephthalic acid, tetrachloroterephthalic acid, methyl terephthalic acid, isophthalic acid and 2,6-naphthalene dicarboxylic acid. It is preferable that the aromatic dicarboxylic acid be selected from the group consisting of terephthalic acid, isophthalic acid and 2,6-napthalene dicarboxylic acid. The more preferable aromatic dicarboxylic acid is terephthalic acid or isophthalic acid.

In the aromatic polyamide composition of the present invention, it is preferable that the poly-m-phenylene isophthalamide (A) have an inherent viscosity of from 0.8 to 2.5 and the other aromatic polyamide (B) have an inherent viscosity of from 0.05 to 3.0. The inherent viscosity (I.V.) is determined by measuring the viscosity ($\eta r$) of a solution of the polymer in concentrated sulfuric acid, at a predetermined concentration (C) in 0.5 g/dl and a temperature of 30° C., and by converting the value of the viscosity ($\eta r$) into a value of I.V. in accordance with the equation:

$$I.V. = ln\eta r/C$$

The poly-m-phenylene isophthalamide (A) and the other aromatic polyamide (B) may each be prepared by any of the conventional polymerization processes, for instance, a solution polymerization process, a interfacial polymerization process, a melt polymerization process and a solid phase polymerization process. In the polymerization process, the aromatic dicarboxylic acid as an acid moiety (2) may be either in the form of the free acid or in the form of a polymerization active derivative thereof, for instance, a lower alkyl ester or an acid halide. It is preferable that the aromatic dicarboxylic acid be used in the form of an acid halide, more preferably, an acid chloride.

The poly-m-phenylene isophthalamide (A) may contain 10 molar % or less of an acid moiety other than the isophthalic acid moiety and/or an amine moiety other than the m-phenylene diamine moiety. The other acid moiety may consist of at least one member selected from the group consisting of terephthalic acid, monochloroterephthalic acid, methylterephthalic acid and 2,6-naphthalene dicarboxylic acid. The other amine moiety may consist of at least one member selected from the group consisting of p-phenylene diamine, monochlorophenylene diamine, 2,4-diminotoluene and 2,6-diaminotoluene. The aromatic polyamide composition may contain additives, for example, a photo-stabilizer, a flame retardant, an anti-oxidant and an anti-static agent, unless the additive adversely affects an object of the present invention.

The aromatic polyamide composition of the present invention can be prepared by uniformly blending the m-phenylene isophthalamide (A) with the other aromatic polyamide (B) by any conventional blending process. For example, the m-phenylene isophthalamide (A) and the other aromatic polyamide (B) may be dissolved together in a basic amide solvent, for instance, N,N'-dimethyl formamide, N,N'-dimethyl acetamide or N-methyl-2-pyrrolidone. The solution can be used for producing filaments, films, fibrils and another shaped articles filaments, films, fibrils and another shaped articles therefrom. The solution may be prepared by any dissolving method. For example, both the polymers (A) and (B) can be simultaneously dissolved in one solvent. The polymers (A) and (B) may be dissolved separately in separate solvents, and the resultant separate solutions may be mixed together so as to form one solution. Otherwise, either one of the polymers (A) and (B) is dissolved in one solvent to provide a solution and, then, the remaining polymer is added into the solution. When either one of the polymers (A) and (B) is prepared by means of a solution polymerization, the remaining polymer may be added, after the completion of the polymerization, into the resultant polymerization solution, or before the start of the polymerization, into the solution polymerization mixture.

The aromatic polyamide composition of the present invention is useful for producing filaments or fibers therefrom. The aromatic polyamide filaments can be produced by any spinning process, for example, a dry spinning process, a wet spinning process or a semi-dry wet process. In each process, a solution of the aromatic polyamide composition in a solvent is extruded through a number of spinning holes and the extruded filamentary streams of the solution are solidified. The solidified filaments are bundled, preferably washed with water and, then, subjected to a drawing process. In the drawing process, the filaments are drawn at a draw ratio of from 1.5 to 5.0 in a proper drawing medium, for example, hot water, an organic liquid or an aqueous solution of a salt, at a temperature of up to 100° C., or in a steam atmosphere at a temperature of from 100° to 140° C. Thereafter, the drawn filaments are heat treated under tension or, preferably, heat drawn at a temperature of 280° C. or more. The heat drawing process may be carried out at a draw ratio of 1.05 to 5.0.

In order to produce the aromatic polyamide filaments or fibers having excellent dyeing properties and superior heat-resisting property, it is necessary to adjust the proportions of the m-phenylene isophthalamide (A) and the other aromatic polyamide (B) in the composition, and the proportions of the halogen- or alkyl- substituted phenylene diamine (a) and the other aromatic diamine (b) in the amine moiety (1), respectively, to a value within the ranges as defined hereinabove. Also, it is preferable that the spinning, drawing and heat-treating operations for producing the aromatic polyamide filaments be, respectively, carried out under the afore-mentioned conditions.

The filaments or fibers consisting essentially of the wholly aromatic polyamide composition of the present invention can be dyed not only with conventional acid dyes and disperse dyes but, also, with conventional cationic dyes, and the dyed filaments can exhibit dyeing fastnesses sufficient for practical use.

The following specific examples are presented for the purpose of clarifying the present invention. However, it should be understood that these examples are intended only to illustrate the present invention and are not intended to limit the scope of the present invention in any way.

In the Examples, as a typical heat-resisting property of the filaments, a thermal shrinkage of the filaments at a temperature of 300° C. was measured. The thermal shrinkage was determined in such a manner that a portion of a filament having a length (lo) was marked, the filament was relaxed in a hot air atmosphere, at a temperature of 300° C., for 30 minutes and, then, a length (l) of the marked portion of the filament was measured. The thermal shrinkage (S 300) in percent was calculated in accordance with the following equation.

$$S\ 300(\%) = lo - l/lo \times 100$$

The dyeing property of the filaments was determined in the following manner.

10.0 g of filaments were immersed in a dyeing liquor having the following composition.

C.I Acid Blue 102: 0.6 g
Ammonium sulfate: 22.5 g
Acetic acid: 6.0 g
p-phenyl phenol: 2.0 g
Water: 300 ml The dyeing liquor was heated to a temperature of 130° C. and maintained at this temperature for 90 minutes, while stirring the dyeing liquor. The filaments were removed from the dyeing liquor and washed with a solution of 0.5 g of sodium carbonate in 300 ml of water, at a temperature of 80° C., for 20 minutes, and then, with fresh water. After drying, the filaments were subjected to measurement of their reflectivity in the following manner.

0.5 g of the dyed filaments were placed evenly in a cell, and the cell was placed in a spectrophotometer and exposed to light having a wave length of 500 millimicrons to measure a reflectivity (R). K/S value of the filaments was determined in accordance with the following equation.

$$K/S = (1-R)^2/2R$$

EXAMPLE 1

A solution was prepared by dissolving 10.995 g of a toluylene diamine mixture consisting of 80 parts by weight of 2,4-diaminotoluene and 20 parts by weight of 2,6-diaminotoluene, in 150 ml of tetrahydrofuran. The solution was gradually added dropwise to another solution of 18.273 g of terephthalic acid chloride in 150 ml of tetrahydrofuran, which other solution had been cooled to a temperature of 0° C., while stirring the resultant slurry. The slurry was mixed with an aqueous solution of 13.4 g of anhydrous sodium carbonate, in 300 ml of water and having a temperature of 0° C., while vigorously stirring the mixture for 3 minutes. Thereafter, 300 ml of water were added to the mixture and the stirring operation was continued for 5 minutes. The resulting polymer was separated from the mixture by means of filtering, and washed with 500 ml of water. The filtering and washing operations were repeated three times. The washed polymer was dried at a temperature of 100° C. under a reduced pressure. The resultant aromatic polyamide (B) exhibited an inherent viscosity of 1.45.

A spinning solution was prepared by dissolving 124.7 g of a poly-m-phenylene isophthalamide (A), having an inherent viscosity of 1.80, and 22.0 g of the above-prepared aromatic polyamide (B) in 552.0 g of N-methyl-2-pyrrolidone. The spinning solution was extruded through 100 spinning holes, each having a diameter of 0.08 mm, into an inorganic salt coagulating liquid containing mainly calcium chloride, at a velocity of 4.2 m/min. The coagulated filaments were washed with water, drawn at a draw ratio of 2.30 in boiling water and, then, additionally drawn at a draw ratio of 1.82 on a hot plate having a temperature of 340° C. The drawn filaments were wound on a bobbin by using a winder.

The resulting filament yarn exhibited a tensile strength of 4.3 g/d, an ultimate elongation of 47%, a thermal shrinkage of 13.5% at a temperature of 300° C. and a K/S value of 10.7.

COMPARISOM EXAMPLE 1

A comparative spinning solution was prepared by dissolving 105 g of a poly-m-phenylene isophthalamide, having an inherent viscosity of 1.80, in 395 ml of N-methyl-2-pyrrolidone. The spinning solution was subjected to the same spinning operation as that described in Example 1. The spun filaments were subjected to the same drawing and additional drawing operations as those mentioned in Example 1.

The resulting comparative filament yarn exhibited a tensile strength of 5.0 g/d, an ultimate elongation of 44%, a thermal shrinkage of 5.0% at a temperature of 300° C. and an extremely small K/S value of 0.9.

EXAMPLES 2 THROUGH 9

In each of Examples 2 through 9, an aromatic polyamide (B) was prepared in the following manner.

A solution of a toluylene diamine mixture (TDA) consisting of 80 parts by weight of 2,4-diaminotoluene and 20 parts by weights of 2,6-diaminotoluene, in an amount as indicated in Table 1, in 125 ml of tetrahydrofuran, was gradually added dropwise into a solution of a type, as indicated in Table 1, of isophthalic acid chloride (IPC) or terephthalic acid (TPC), in an amount as indicated in Table 1, in 125 ml of tetrahydrofuran and having a temperature of 0° C., while stirring the resultant slurry. The slurry was mixed with an aqueous solution of 25.0 g of anhydrous sodium carbonate in 250 ml of water and having a temperature of 0° C., while vigorously stirring the mixture. After stirring for 3 minutes, 300 ml of water was added to the mixture and the mixture was additionally stirred for 5 minutes. The resultant polymer was separated from the mixture by means of filtering and, then, washed with 500 ml of water. After the filtering and washing operations were repeated three times, the washed polymer was dried at a temperature of 100° C. under a reduced pressure. The resulting aromatic polyamide (B) exhibited an inherent viscosity as indicated in Table 1.

A spinning solution was prepared by dissolving 20.0 g of poly-m-phenylene isophthalamide (A) and 4.0 g of the above-prepared aromatic polyamide (B) in 80 ml of N-methyl-2-pyrrolidone. The solution was extruded through 40 spinning holes, each having a diameter of 0.08 mm, at a velocity of 4.0 m/min, into an inorganic salt coagulating liquid containing mainly calcium chloride. The resultant coagulated filaments were washed with water, drawn at a draw ratio (DR$_1$) as indicated in Table 1 and, then, additionally drawn at a draw ratio (DR$_2$) as indicated in Table 1 on a hot plate having a temperature (T) as indicated in Table 1.

The properties of the resultant filament yarns are shown in Table 1.

Table 1

| | Aromatic Polyamide (B) Composition | | | | | | | Filament | | | |
|---|---|---|---|---|---|---|---|---|---|---|---|
| | Amine moiety g (molar part) | Acid moiety g (molar part) | | | Drawing | | | Tensile strength | Ultimate elongation | S$_{300}$ | Shrinkage at 300° C. |
| Example No. | TDA | IPC | TPC | I.V. | DR$_1$ | DR$_2$ | T (°C.) | (g/de) | (%) | K/S | (%) |
| 2 | 15.27 (100) | 38.09 (150) | — | 0.09 | 2.30 | 1.82 | 340 | 2.9 | 55 | 16.9 | 15.5 |
| 3 | 22.91 (150) | 25.38 (100) | — | 0.12 | 2.30 | 1.82 | 300 | 4.5 | 41 | 15.7 | 12.5 |
| 4 | (150) | (100) | | | 2.30 | 1.82 | 350 | 4.3 | 32 | 14.6 | 4.5 |
| 5 | 15.27 (100) | — | 38.07 (150) | 0.14 | 2.30 | 1.82 | 320 | 2.5 | 43 | 11.8 | 10.5 |
| 6 | (100) | | (150) | | 2.80 | 1.56 | 340 | 2.6 | 30 | 7.0 | 4.0 |
| 7 | | | | | 2.30 | 1.82 | 300 | 3.6 | 48 | 13.7 | 19.5 |
| 8 | 22.91 (150) | 25.38 — | (100) | 0.16 | 2.30 | 1.82 | 350 | 3.1 | 33 | 12.2 | 6.0 |
| 9 | | | | | 2.80 | 1.56 | 350 | 4.1 | 34 | 10.9 | 4.5 |

Note:
TDA: Toluylene diamin mixture consisting of 80 parts by weight of 2,4 diamino toluene and 20 parts by weight of 2,6-diamino toluene
IPC: Isophthalic acid chloride
TPC: Terephthalic acid chloride

EXAMPLES 10 THROUGH 15

In each of the Examples 10 through 15, the same procedures were used as those described in Examples 2 through 9, except that the amounts of the toluylene diamine mixture (TDA) and IPC or TPC, the values of inherent viscosity (I.V) of the resultant aromatic polyamide (B) and the draw ratios (DR$_1$ and DR$_2$), and the temperature (T) of the hot plate were as indicated in Table 2, and; in Example 10, aniline (AN) in an amount indicated in Table 2 was used as an additional amine moiety in addition to the toluylene diamine mixture; in Example 11, p-chloroaniline (CAN) in amount indicated in Table 2 was used as an additional amine moiety in addition to the toluylene diamine mixture; in Examples 12 and 13, benzoyl chloride in an amount indicated in Table 2 was used as an additional acid moiety in addition to isophthalic acid chloride; 29 in Examples 14 and 15, p-chlorobenzoyl chloride (CBC) was used as an additional acid moiety in addition to isophthalic acid chloride.

The properties of the resulting filament yarns are shown in Table 2.

used in place of the toluylene diamine mixture, and; except that in Examples 21, 22 and 23, the amounts of the 2,4-diaminotoluene and IPC or TPC, the value of inherent viscosity of the resultant aromatic polyamide Table 2

| | Item | | | | | | | | | | |
|---|---|---|---|---|---|---|---|---|---|---|---|
| | Aromatic polyamide (B) | | | | | | | Filament | | | |
| | Amine moiety g (molar part) | | Acid moiety g (molar part) | | | | | | | | |
| Example No. | TDA | Additional amine moiety | IPC | Additional acid moiety | I.V. | Drawing DR$_1$ | DR$_2$ | T (°C.) | Tensile strength (g/de) | Ultimate elongation (%) | K/S | Shrinkage at 300° C. S$_{300}$ (%) |
| 10 | 14.51 (95) | AN 1.71 (10) | 25.40 (100) | | 0.34 | 280 | 1.56 | 350 | 4.0 | 24 | 6.8 | 5.5 |
| 11 | 14.51 (95) | CAN 1.59 (10) | 25.39 (100) | | 0.33 | 280 | 1.56 | 350 | 4.1 | 35 | 5.0 | 7.0 |
| 12 | 15.31 (95) | | 24.11 | | 0.37 | 2.30 | 1.80 | 350 | 3.1 | 58 | 12.5 | 17.5 |
| 13 | (100) | | | BC 1.83 (10) | | 2.80 | 1.56 | 350 | 3.5 | 42 | 7.5 | 5.5 |
| 14 | 15.32 | | 24.11 (95) | | 0.29 | 2.30 | 1.80 | 350 | 4.2 | 35 | 13.7 | 6.5 |
| 15 | (100) | | | CBC 231 (10) | | 2.80 | 1.56 | 350 | 4.1 | 38 | 7.2 | 5.0 |

EXAMPLES 16 through 23 and COMPARISON EXAMPLES 2 through 6

In each of the Examples 16 through 23 and Comparison Examples 2 through 16, procedures identical to those mentioned in Examples 2 through 9 were carried out, except that 2,4-diaminotoluene (2,4-DAT) was and the draw ratios (DR$_1$ and DR$_2$), and the temperature (T) of the hot plate, were as indicated in Table 3, and a type of additional amine moiety (4,4'-ODA, MPO or MDA) indicated in Table 3 was used in an amount indicated in Table 3.

The properties of the resulting filament yarns are also shown in Table 3.

Table 3

| | Item | | | | | | | | | | | |
|---|---|---|---|---|---|---|---|---|---|---|---|---|
| | Aromatic polyamide (B) | | | | | | | | Filament | | | |
| | Amine moiety (molar %) | | | Acid moiety (molar %) | | | Drawing | | | Tensile strength (g/de) | Ultimate elongation (%) | K/S | Shrinkage at 300° C. S$_{300}$ (%) |
| Example No. | 2,4-DAT | Additional amine moiety | | TPC | IPC | I.V. | DR$_1$ | DR$_2$ | T (°C.) | | | | |
| Example 16 | 85 | 4,4'-ODA 15 | | 100 | | 1.47 | 2.5 | 2.5 | 320 | 4.6 | 15 | 15.7 | 7.0 |
| Comparison Example 2 | 15 | MPD 85 | | | 100 | 1.86 | 3.0 | 1.4 | 310 | 6.3 | 42 | 2.0 | 7.5 |
| | | | | | | | 2.0 | 2.3 | 310 | 6.4 | 35 | 2.0 | 11.5 |
| Example 17 | 50 | MPD 50 | | | 100 | 1.59 | 2.3 | 2.5 | 350 | 6.7 | 17 | 16.9 | 3.0 |
| Comparison Example 3 | 10 | MPD 90 | | | 100 | 2.22 | 2.3 | 1.8 | 300 | 5.7 | 55 | 3.0 | 49.0 |
| 4 | | | | | | | 2.3 | 1.8 | 350 | 5.1 | 51 | 1.5 | 2.0 |
| 5 | 20 | MPD 80 | | | 100 | 1.93 | 2.3 | 1.8 | 300 | 5.1 | 53 | 3.7 | 56.0 |
| 6 | | | | | | | 2.3 | 1.8 | 350 | 5.8 | 51 | 2.3 | 4.5 |
| Example 18 | 15 | MDA 85 | | | 100 | 1.44 | 2.3 | 1.8 | 300 | 4.6 | 40 | 8.0 | 30.0 |
| 19 | | | | | | | 2.3 | 1.8 | 330 | 2.7 | 33 | 10.7 | 28.2 |
| 20 | 85 | MPD 15 | | | 100 | 0.83 | 2.3 | 1.8 | 330 | 3.6 | 58 | 14.6 | 24.0 |
| 21 | | | | | | | 3.20 | 1.20 | 360 | 4.7 | 53 | 9.0 | 10.0 |
| 22 | TAD 50 | MPD 50 | | | 100 | 1.70 | 2.30 | 1.80 | 330 | 3.9 | 53 | 9.0 | 27.5 |

Table 3-continued

| | Aromatic polyamide (B) | | | | | | | Filament | | | |
|---|---|---|---|---|---|---|---|---|---|---|---|
| | Amine moiety (molar %) | | Acid moiety (molar %) | | | Drawing | | | Tensile strength | Ultimate elongation | | Shrinkage at 300° C. |
| Example No. | 2,4-DAT | Additional amine moiety | TPC | IPC | I.V. | DR$_1$ | DR$_2$ | T (°C.) | (g/de) | (%) | K/S | S$_{300}$ (%) |
| 23 | | | | | | 2.30 | 1.80 | 350 | 4.1 | 73 | 11.5 | 23.0 |

(Note)

2,4-DAT: 2,4-diamino toluene, 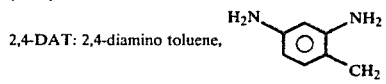

4,4'-ODA: 4,4'-diamino diphenylether, 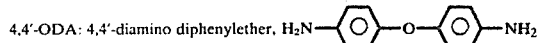

MPD: m-phenylene diamine, 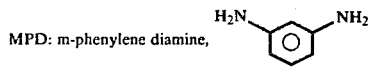

MDA: 4,4'-diamino diphenyl methane, 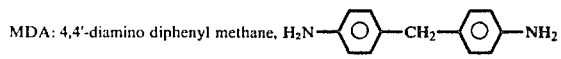

EXAMPLE 24 AND COMPARISON EXAMPLE 7

(Dyeing test)

A dyeing test specimen was prepared from 5.0 g of the same filaments (Example 24) as those prepared in Example 1 and 5.0 g of the same comparative filaments (Comparison Example 7) as those prepared in Comparison Example 1. The dyeing test specimen was dyed by using a dyeing liquor A, the composition of which will be indicated hereinbelow, at a temperature of 130° C., for 90 minutes. The dyed specimen was soaked with a solution of 0.5 g of sodium carbonate, in 300 ml of water, at a temperature of 80° C., for 20 minutes.

The same dyeing test as that mentioned above was carried out twice by using dyeing liquors B and C, the compositions of which are indicated below, and the dyed filaments were soaked with a solution of 0.2 g of Scourol #400 (a trademark of a non-ionic surface active agent made by Du Pont), in 300 ml of water, at a temperature of 100° C., for 30 minutes.

| Dyeing liquor A | |
|---|---|
| C.I. Acid Red 6 | 0.6 g (6.0% owf) |
| Carrier indicated in Table 4 | 2.0 g (20% owf) |
| Acetic acid | 6.0 g |
| (NH$_4$)$_2$SO$_4$ | 22.5 g |
| Water | 300 ml |
| Liquor ratio : 1/30 | |

| Dyeing liquor B | |
|---|---|
| Diacryl Golden Yellow GL-N (A trademark of a basic dye made by Mitsubishi Kasei Kogyo K.K.) | 0.6 g (6.0% owf) |
| Carrier indicated in Table 4 | An amount indicated in Table 4 |
| Acetic acid | 0.06 g |
| NaNO$_3$ | 7.5 g |
| Water | 300 ml |
| Liquor ratio : 1/30 | |

| Dyeing liquor C | |
|---|---|
| Diacryl red MSN (A trademark of a basic dye made by Mitsubishi Kasei) | 0.6 g (6.0% owf) |
| Carrier indicated in Table 4 | An amount indicated in Table 4 |
| Acetic acid | 0.06 g |
| NaNO$_3$ | 7.5 g |
| Water | 300 ml |
| Liquor ratio: 1/30 | |

The results of the dyeing tests are shown in Table 4.

Table 1

| Dyeing Test | | | K/S | |
|---|---|---|---|---|
| | Carrier | | | |
| Dyeing liquor | Type | Amount (%)owf | Example 24 | Comparison Example 7 |
| A | p-phenyl phenol | 20 | 19.1 | 1.7 |
| | Acetophenone | 80 | 10.2 1.3 | |
| B | p-phenyl phenol | 20 | 19.9 | 3.1 |
| | Acetophenone | 80 | 19.0 | |
| 7.0 | | | | |
| | Dimethyl phthalate | 20 | 19.0 | 2.3 |
| | none | | 11.5 | 1.6 |
| C | p-phenyl phenol | 20 | 17.5 | 2.5 |
| | Acetophenone | 80 | 19.1 | 4.6 |
| | Dimethyl phthalate | 20 | 17.5 | 1.8 |
| | none | | 7.8 | 1.0 |

EXAMPLES 25 THROUGH 28

In each of Examples 25 through 28, the same procedures as those mentioned in Example 1 were carried out, except that the toluylene diamine mixture was replaced by one or two diamine compounds as indicated in Table 5, in amounts as indicated in Table 5, and the resultant aromatic polyamide (B) exhibited an inherent viscosity as indicated in Table 5.

The properties of the resultant filament yarns are also shown in Table 5.

Table 5

| Example No. | Aromatic polyamide (B) Amine moiety Compound | Amount (g) | I.V | Filament Tensile strength (g/d) | Ultimate elongation (%) | K/S | Shrinkage at 300° C. (S300) (%) |
|---|---|---|---|---|---|---|---|
| 25 | 4-ethyl-m-phenylene diamine | 12.240 | 0.52 | 3.4 | 45 | 9.4 | 14.5 |
| 26 | 4-isopropyl-m--phenylene diamine | 13.500 | 0.45 | 3.0 | 54 | 10.5 | 17.8 |
| 27 | 1-methyl-p-phenylene diamine | 5.496 | 0.35 | 2.5 | 62 | 12.1 | 29.5 |
|  | m-phenylene diamine | 4.866 |  |  |  |  |  |
| 28 | 2,5-dimethyl-m-phenylene diamine | 8.568 | 0.28 | 2.6 | 70 | 13.8 | 30.0 |
|  | p-phenylene diamine | 2.920 |  |  |  |  |  |

EXAMPLE 29

A solution of 17.824 g of 4-chloro-m-phenylene diamine (DACB) in 125 ml of tetrahydrofuran was gradually added dropwise to a solution of 25.379 g of isophthalic acid chloride in 125 ml of tetrahydrofuran and having a temperature of 0° C., while stirring the resulting slurry. The slurry was mixed with a solution of 2.12 g of anhydrous sodium carbonate in 250 ml of water and having a temperature of 3° C., while vigorously stirring the resulting mixture. After stirring for 3 minutes, the mixture was mixed with 300 ml of water, and the mixture was additionally stirred for 5 minutes. The resultant polymer was separated from the mixture by repeating three times a filtering operation and a washing operation with about 500 ml of water. The finally filtered polymer was dried at a temperature of 100° C. under a reduced pressure. The obtained aromatic polyamide (B) exhibited an inherent viscosity of 0.24.

A spinning solution was prepared by dissolving 20.0 g of a poly-m-phenylene isophthalamide, having an inherent viscosity of 1.80, and 4.0 g of the above-obtained aromatic polyamide (B) in 80 ml of N-methyl-2-pyrrolidone. The spinning solution was extruded through 20 spinning holes, each having a diameter of 0.08 mm, at a speed of 4.0 m/min into an inorganic salt coagulating solution containing mainly calcium chloride. The resulting coagulated filaments were washed with water, drawn at a draw ratio of 2.30 in boiling water and, then, additionally drawn at a draw ratio of 1.80 on a hot plate having a temperature of 350° C. The drawn filaments were wound on a bobbin by using a winder.

The obtained filament yarn exhibited a tensile strength of 4.1 g/d, an ultimate elongation of 53%, a thermal shrinkage of 7.5% at a temperature of 300° C. and a value of K/S of 11.5.

COMPARISON EXAMPLE 8

A spinning solution was prepared by dissolving 21.0 g of the same poly-m-phenylene isophthalamide as that mentioned in Example 29, in 79.0 g of N-methyl-2-pyrrolidone. The spinning solution was converted into a filament yarn in the same manner as that described in Example 29. The resultant filament yarn exhibited a tensile strength of 4.9 g/d, an ultimate elongation of 45%, a thermal shrinkage of 4.0% at a temperature of 300° C. and a very poor value of K/S of 0.8.

EXAMPLES 30 THROUGH 32 AND COMPARISON EXAMPLES 9 THROUGH 11

In each of the Examples 30 through 32 and the Comparison Examples 9 through 11, a solution of an amino moiely consisting of 4-chloro-m-phenylene diamine (DACB) and m-phenylene diamine (MPD), respectively in an amount as indicated in Table 6, in 125 ml of tetrahydrofuran was gradually added dropwise into a solution of an acid moiety consisting of isophthalic acid chloride, in an amount as indicated in Table 6, in 125 ml of tetrahydrofuran and having a temperature of 0° C., while stirring the resulting slurry. The slurry was mixed with a solution of 21.2 g of anhydrous sodium carbonate in 250 ml of water and having a temperature of 3° C. After stirring for 3 minutes, the mixture was mixed with about 250 ml of water and the mixture was stirred for 5 minutes. The resultant polymer was separated from the mixture by means of filtering and, then, the polymer was subjected to three repeated washing operations, with about 500 ml of water, and filtering operations. The finally filtered polymer was dried at a temperature of 100° C. under a reduced pressure. The obtained aromatic polyamide (B) exhibited an inherent viscosity as indicated in Table 6.

A spinning solution was prepared by dissolving 4.0 g of the above-obtained aromatic polyamide (A) and 20.0 g of the same poly-m-phenylene isophthalamide as that mentioned in Example 29, in 80 ml of N-methyl-2-pyrrolidone. The spinning solution was converted into coagulated filaments in the same manner as that mentioned in Example 29. The coagulated filaments were washed with water, drawn at a draw ratio (DR$_1$) as indicated in Table 6 in boiling water and, then, additionally drawn at a draw ratio (DR$_2$) as indicated in Table 6 on a hot plate having a temperature (T) as indicated in Table 6.

The resultant filament yarns of Examples 30 through 32 and Comparison Examples 9 through 11 are shown also in Table 6.

Table 6

| Example No. | Aromatic polyamides (B) Amine moiety g (molar %) DACB | Acid moiety g (molar %) MPD | IPC | I.V. | Drawing DR$_1$ | DR$_2$ | T (°C.) | Filament Tensile strength (g/d) | Ultimate elongation (%) | Shrinkage at 300° C. (%) | K/S |
|---|---|---|---|---|---|---|---|---|---|---|---|
| Example |||||||||||||
| 30 | 13.368 | 3.379 | 25.379 | 0.36 | 2.30 | 1.80 | 300 | 4.0 | 38 | 27.0 | 11.8 |
| 31 | (75) | (25) | (100) |  | 2.30 | 1.80 | 350 | 2.9 | 41 | 5.5 | 9.7 |
| 32 | 8.912 | 6.759 | 25.379 | 0.37 | 2.30 | 1.80 | 300 | 4.6 | 38 | 8.5 | 8.8 |
|  | (50) | (50) | (100) |  |  |  |  |  |  |  |  |
| Comparison Example |||||||||||||
| 9 | 4.456 | 10.38 | 25.379 | 0.80 | 2.30 | 1.80 | 300 | 3.8 | 50 | 38 | 9.0 |
| 10 | (25) | (75) | (100) |  | 2.30 | 1.80 | 350 | 4.1 | 37 | 4.0 | 2.2 |
| 11 |  |  |  |  | 2.80 | 1.56 | 350 | 4.8 | 29 | 3.0 | 0.7 |

Note:
DACB: 4-chloro-m-phenylene diamine
MPD: m-phenylene diamine
IPC: Isophthalic acid chloride

EXAMPLES 33 THROUGH 45

In each of the Examples 33 through 45, an aromatic polyamide was prepared from the amine moiety compound or compounds and the acid moiety compound or compounds as indicated in Table 7, each in an amount as indicated in Table 7, in accordance with a method similar to that described in Example 29.

A spinning solution was prepared from 4.0 g of the aromatic polyamide (B) and 20.0 g of the same poly-m-phenylene isophthalamide as that mentioned in Example 29, in the same manner as that mentioned in Example 29. The spinning solution was converted into a filament yarn in the same manner as that mentioned in Example 29, except that the draw ratio (DR$_1$) in the boiling water, the draw ratio (DR$_2$) on the hot plate and the temperature (T) of the hot plate were as indicated in Table 7.

The properties of the filament yarns of Examples 33 through 45 are shown in Table 7.

EXAMPLES 46 THROUGH 51

In each of the Examples 46 through 51, a blend of the same aromatic polyamide (B) as that mentioned in Example 29 and a poly-m-phenylene isophthalamide, (A) having an inherent viscosity of 2.00, in proportions as indicated in Table 7, was dissolved in N-methyl-2-pyrrolidone, to provide a spinning solution having a concentration of the sum of the aromatic polyamides (A) and (B) of 20.5% by weight. The spinning solution was extruded through 100 spinning holes, each having a diameter of 0.09 mm, at a velocity of 11.3 m/min into an inorganic salt coagulating liquid containing mainly calcium chloride. The coagulated filaments were washed with water, drawn at a draw ratio of 2.83 in boiling water and, then, additionally drawn at a draw ratio of 1.56 on a hot plate having a temperature of 350° C. The drawn filaments were wound on a bobbin by using a winder.

The properties of each resultant filament yarn are shown in Table 8.

Table 7

| Example No. | Aromatic polyamide (B) Amine moiety g (molar %) DACB | MPD | TDA | Acid moiety g (molar %) IPC | TPC | I.V. | Drawing DR$_1$ | DR$_2$ | T (°C.) | Filament Tensile strength (g/d) | Ultimate elongation (%) | Shrinkage at 300° C. (%) | K/S |
|---|---|---|---|---|---|---|---|---|---|---|---|---|---|
| 33 |  |  |  |  |  |  | 2.30 | 1.80 | 300 | 4.7 | 35 | 16.5 | 7.5 |
| 34 | 17.824 | — | — | 12.689 | 12.689 | 0.33 | 2.30 | 1.80 | 350 | 3.2 | 39 | 3.5 | 11.8 |
| 35 | (100) | — | — | (50) | (50) |  | 2.80 | 1.56 | 350 | 4.6 | 29 | 2.5 | 2.5 |
| 36 | 17.824 | — | — | — | 25.379 |  | 2.30 | 1.80 | 300 | 4.0 | 46 | 30.0 | 16.9 |
| 37 | (100) | — | — | — | (100) | 0.35 | 2.30 | 1.80 | 350 | 3.3 | 48 | 5.5 | 15.7 |
| 38 |  |  |  |  |  |  | 2.80 | 1.56 | 350 | 4.7 | 32 | 2.5 | 6.2 |
| 39 | 8.912 | — | 7.636 | 25.378 | — |  | 2.30 | 1.80 | 300 | 4.0 | 44 | 12.0 | 11.8 |
| 40 | (50) | — | (50) | (100) | — | 0.63 | 2.30 | 1.80 | 350 | 4.2 | 34 | 11.0 | 14.2 |
| 41 |  |  |  |  |  |  | 2.80 | 1.56 | 350 | 4.5 | 39 | 3.5 | 6.2 |
| 42 | 8.912 | — | 7.636 | — | 25.379 |  | 2.30 | 1.80 | 350 | 2.5 | 49 | 21.0 | 20.8 |
|  |  |  |  |  |  | 0.68 |  |  |  |  |  |  |  |
| 43 | (50) | — | (50) | — | (100) |  | 2.80 | 1.56 | 350 | 4.0 | 42 | 5.0 | 15.1 |
| 44 | 8.912 | 6.759 | — | — | 25.379 |  | 2.30 | 1.80 | 350 | 3.6 | 43 | 3.5 | 10.4 |
|  |  |  |  |  |  | 0.33 |  |  |  |  |  |  |  |
| 45 | (50) | (50) | — | — | (100) |  | 2.80 | 1.56 | 350 | 4.7 | 33 | 2.5 | 3.0 |

(Note)
TDA: Toluylene diamine mixture consisting of 20% of by weight of 2,4-toluylene diamine and 80% by weight of 2,6-toluylene diamine
TPC: Terephthalic acid chloride Table 8

| Example No. | Proportion of aromatic polyamide-(B) % | Filament Tensile strength (g/de) | Ultimate elongation (%) | Shrinkage at 300° C. (%) | K/S |
|---|---|---|---|---|---|
| 46 | 10.0 | 4.1 | 39 | 7.0 | 3.6 |
| 47 | 12.5 | 3.9 | 42 | 9.4 | 5.1 |
| 48 | 15.0 | 4.3 | 45 | 9.3 | 10.1 |
| 49 | 17.5 | 3.8 | 47 | 10.4 | 10.6 |
| 50 | 20.0 | 3.8 | 44 | 10.7 | 12.2 |
| 51 | 25.0 | 3.1 | 54 | 16.4 | 14.6 |

Time: 90 minutes

The dyed filaments were soaked with a solution of 0.2 g of Scourol #400 in 300 ml of water, at a temperature of 100° C., for 30 minutes.

Dyeing liquor C

The composition of Dyeing liquor C is the same as that of Dyeing liquor B, except that Diacryl Red MSN was used in place of Diacryl Golden Yellow GL-N. The dyeing conditions for the filaments with Dyeing liquor C are the same as those of Dyeing liquor B. Also, the dyed filaments were soaked in the same manner as the filaments dyed with dyeing liquor B.

The results are shown in Table 9.

Table 9

| Dyeing liquor | Dyeing test Carrier Type | Amount (%)owf | K/S Example 52 | K/S Comparison Example 12 |
|---|---|---|---|---|
| A | p-phenyl phenol | 20 | 14.2 | 1.8 |
|   | Acetophenone | 80 | 6.3 | 1.5 |
| B | p-phenyl phenol | 20 | 13.8 | 3.3 |
|   | Acetophenone | 80 | 13.5 | 7.2 |
|   | Dimethyl phthalate | 20 | 13.2 | 2.8 |
|   | none |   | 5.2 | 2.0 |
| C | p-phenyl phenol | 20 | 11.4 | 2.9 |
|   | Acetophenone | 80 | 13.0 | 5.0 |
|   | Dimethyl phthalate | 20 | 11.5 | 1.9 |
|   | none |   | 4.1 | 1.2 |

EXAMPLES 53 THROUGH 60

In each of the Examples 53 through 60, an aromatic polyamide (B) was provided by the following method. A solution of 178.25 g of 4-chloro-m-phenylene diamine (DACB) in 1250 ml of tetrahydrofuran was gradually added dropwise to a solution of 253.79 g of terephthalic acid chloride in 1250 ml of tetrahydrofuran and having a temperature of 0° C., while stirring the resulting slurry. The slurry was mixed with a solution of 212 g of anhydrous sodium carbonate in 2500 ml of water and having a temperature of 3° C., while vigorously stirring the mixture. After stirring for 3 minutes, 3.0 l of water were mixed with the mixture, and the mixture was stirred for 2 minutes. The resultant polymer was separated from the mixture by means of filtering. The filtered polymer was washed with 5 l of water three times. The polymer was dried at a temperature of 100° C. under a reduced pressure. The resultant aromatic polyamide (B) (poly-4-chloro-m-phenylene terephthalamide) exhibited an inherent viscosity of 0.31.

The aromatic polyamide (B), prepared as mentioned above, and the same poly-m-phenylene isophthalamide (A) as that mentioned in Example 29, in amounts as indicated in Table 10, were dissolved in N-methyl-2-pyrrolidone in the same manner as that mentioned in Example 29. The spinning solution was extruded through 100 spinning holes, each having a diameter of 0.08 mm, at a speed of 4 m/min., into an inorganic salt coagulating liquid containing mainly calcium chloride. The resulting coagulated filaments were washed with water, drawn at a draw ratio ($DR_1$) as indicated in Table 10 in boiling water and, then, additionally drawn at a draw ratio ($DR_2$) as indicated in Table 10, on a hot plate having a temperature (T) as indicated in Table 10. The drawn filaments were wound on a bobbin by using a winder.

The properties of the resultant filament yarn are shown in Table 10.

Table 10

| Example No. | Proportion (wt%) Poly-m-phenylene isophthalamide | Proportion (wt%) Aromatic polyamide (B) | Drawing $DR_1$ | Drawing $DR_2$ | T (°C.) | at 300° C. K/S | Filament Shrinkage Tensile S 300 (%) | elongation strength (g/d) | Ultimate tion (%) |
|---|---|---|---|---|---|---|---|---|---|
| 53 |   |   | 2.30 | 1.82 | 350 | 6.5 | 6.5 | 3.8 | 39 |
| 54 | 82.0 | 18.0 | 2.80 | 1.56 | 350 | 4.0 | 5.5 | 4.0 | 35 |
| 55 |   |   | 2.30 | 1.82 | 330 | 6.3 | 6.5 | 3.8 | 41 |
| 56 |   |   | 2.80 | 1.56 | 330 | 4.4 | 6.5 | 4.2 | 38 |
| 57 |   |   | 2.30 | 1.82 | 350 | 10.1 | 7.5 | 3.6 | 47 |
| 58 | 79.0 | 21.0 | 2.80 | 1.56 | 350 | 6.6 | 5.5 | 3.9 | 45 |
| 59 |   |   | 2.30 | 1.82 | 330 | 11.5 | 6.0 | 3.5 | 50 |
| 60 |   |   | 2.80 | 1.56 | 330 | 7.4 | 6.5 | 4.0 | 47 |

EXAMPLES 61 THROUGH 64

In each of the Examples 61 through 64, the same procedures as those described in Example 29 were carried out, except that the 4-chloro-m-phenylene diamine was replaced by another halogen-substituted phenylene, diamine (a) as indicated in Table 11, in an amount as indicated in Table 11. The properties of the resultant filament yarn are shown in Table 11.

Table II

| Item | | | Filament | | |
|---|---|---|---|---|---|
| Halogen-substituted phenylene diamine | | | Shrinkage at 300° C. (%) | Tensile strength (g/d) | Ultimate elongation (%) |
| Example No. | Type | Amount (g) | K/S | | |
| 61 | chloro-p-phenylene diamine | 17.82 | 10.5 | 8.0 | 4.0 | 45 |
| 62 | 2,4-dichloro-m-phenylene diamine | 22.14 | 11.2 | 10.7 | 3.9 | 48 |
| 63 | 4-bromo-m-phenylene diamine | 23.38 | 12.3 | 9.0 | 4.2 | 44 |
| 64 | 2,5-dichloro-p-phenylene diamine | 22.14 | 12.5 | 11.1 | 3.7 | 52 |

What we claim is:

1. A wholly aromatic polyamide composition, comprising:
(A) 50 to 95% by weight of a poly-m-phenylene isophthalamide having an inherent viscosity of from 0.8 to 2.5, determined at a concentration of 0.5 g/dl in a concentrated sulfuric acid at a temperature of 30° C., and;
5 to 50% by weight of at least one other aromatic polyamide which comprises:
(1) an amine moiety consisting essentially of
(a) 35 to 100 molar % of at least one phenylene diamine in which the phenylene group has 1 to 4 substituents respectively selected, independently from each other, from the group consisting of halogen atoms and alkyl radicals having 1 to 4 carbon atoms, and;
(b) 0 to 65 molar % of at least one other aromatic diamine, and;
(2) an acid moiety consisting essentially of at least one aromatic dicarboxylic acid and which has an inherent viscosity of from 0.05 to 3.0, determined at a concentration of 0.5 g/dl, in a concentrated sulfuric acid, at a temperature of 30° C.

2. A wholly aromatic polyamide composition as claimed in claim 1, wherein said halogen-or alkyl-substituted phenylene diamine (a) is selected from the group consisting of halogen- or alkyl-substituted m-phenylene diamines and halogen- or alkyl-substituted p-phenylene diamines.

3. A wholly aromatic polyamide composition as claimed in claim 1, wherein said substituent in said phenylene group is selected from the group consisting of fluorine, chlorine, bromine and iodine atoms, and methyl, ethyl, propyl and butyl radicals.

4. A wholly aromatic polyamide composition as claimed in claim 1, wherein the number of said substituents in said phenylene group is 1 or 2.

5. A wholly aromatic polyamide composition as claimed in claim 1, wherein the number of the carbon atoms in said alkyl radical in said phenylene group is 1 or 2.

6. A wholly aromatic polyamide composition as claimed in claim 1, wherein said other aromatic diamine (b) is selected from the group consisting of unsubstituted phenylene diamines, naphthylene diamines, biphenylene diamines, diphenylether diamines, diphenylthioether diamines, diphenylmethane diamines and diphenylsulfonate diamines.

7. A wholly aromatic polyamide composition as claimed in claim 1, wherein said aromatic dicarboxylic acid as the acid moiety (2) is selected from the group consisting of unsubstituted and substituted phenylene dicarboxylic acids and naphthalene dicarboxylic acids.

8. A wholly aromatic polyamide composition as claimed in claim 7, wherein said substituted phenylene dicarboxylic acid and naphthalene dicarboxylic acid have at least one substituent which is bonded to the aromatic ring thereof, and which is not reactive to acid halide radicals and amino radicals.

9. A wholly aromatic polyamide composition as claimed in claim 8, wherein said substituent is selected from the group consisting of halogen atoms, alkyl radicals having 1 or 2 carbon atoms, a phenyl radical, carboalkoxy radicals in which the alkoxy group has 1 or 2 carbon atoms, alkoxy radicals having 1 or 2 carbon atoms, a nitro radical and thioalkyl radicals having 1 or 2 carbon atoms.

10. A filament or fiber consisting essentially of the wholly aromatic polyamide composition as claimed in claim 1.

11. A filament or fiber as claimed in claim 10, wherein said filament or fiber exhibit a thermal shrinkage of 30% or less at a temperature of 300° C.

* * * * *

UNITED STATES PATENT AND TRADEMARK OFFICE
CERTIFICATE OF CORRECTION

PATENT NO. : 4,245,066       Page 1 of 2

DATED : Jan. 13, 1981

INVENTOR(S) : Yasuo Nakagawa, et al

It is certified that error appears in the above—identified patent and that said Letters Patent is hereby corrected as shown below:

Column 4, line 10: "atom" should be --atoms--.

Column 7, line 17: "COMPARISOM" should be --COMPARISON--.

Table 1, in Note: After "Toluylene", "diamin" should be --diamine--.

Column 9, Table 2, in Example 15: "CBC 231" should be --CBC 2.31--.

Column 12, line 43: "Table 1" should be --Table 4--.

line 48, under Example 24: "10.2 1.3" should be in separate columns: "10.2" should be under Example 24 and "1.3" should be under the column entitled "Comparison Example 7".

line 51, in Table: "7.0" should be under column entitled "Comparison Example 7".

Column 13, Table 5, Example 27: "1-methyl" should be --2-methyl--.

UNITED STATES PATENT AND TRADEMARK OFFICE
CERTIFICATE OF CORRECTION

PATENT NO. : 4,245,066

DATED : Jan. 13, 1981

INVENTOR(S) : Yasuo Nakagawa, et al

It is certified that error appears in the above—identified patent and that said Letters Patent is hereby corrected as shown below:

Column 14, line 34: "moiely" should be --moiety--

Column 15, Table 6, Comparison Example 9: "10.38" should be --10.138--.

Signed and Sealed this

Twenty-eighth Day of July 1981

[SEAL]

Attest:

Attesting Officer

GERALD J. MOSSINGHOFF

Commissioner of Patents and Trademarks